United States Patent
Yablokov et al.

(10) Patent No.: US 10,747,890 B2
(45) Date of Patent: Aug. 18, 2020

(54) SYSTEM AND METHOD OF CONTROLLING ACCESS TO CONTENT USING AN ACCESSIBILITY API

(71) Applicant: AO Kaspersky Lab, Moscow (RU)

(72) Inventors: Victor V. Yablokov, Moscow (RU); Konstantin M. Filatov, Moscow (RU)

(73) Assignee: AO Kapersky Lab, Moscow (RU)

( * ) Notice: Subject to any disclaimer, the term of this patent is extended or adjusted under 35 U.S.C. 154(b) by 149 days.

(21) Appl. No.: 15/581,056

(22) Filed: Apr. 28, 2017

(65) Prior Publication Data
US 2018/0276396 A1 Sep. 27, 2018

(30) Foreign Application Priority Data
Mar. 24, 2017 (RU) .................................. 2017109812

(51) Int. Cl.
  *G06F 21/60* (2013.01)
  *G06F 21/53* (2013.01)
  *G06F 21/62* (2013.01)

(52) U.S. Cl.
  CPC ............ *G06F 21/604* (2013.01); *G06F 21/53* (2013.01); *G06F 21/62* (2013.01); *G06F 21/6218* (2013.01); *G06F 2221/032* (2013.01)

(58) Field of Classification Search
  CPC ........ G06F 21/604; G06F 21/53; G06F 21/62; G06F 21/6218
  See application file for complete search history.

(56) References Cited

U.S. PATENT DOCUMENTS

| | | | |
|---|---|---|---|
| 9,154,912 B2 | 10/2015 | Zubas et al. | |
| 9,536,101 B1* | 1/2017 | Demov | G06F 21/62 |
| 9,807,111 B1* | 10/2017 | Woodward | H04L 63/1441 |
| 9,825,977 B2* | 11/2017 | Demov | G06F 21/62 |
| 2007/0240055 A1* | 10/2007 | Ting | G06F 9/54 715/704 |
| 2008/0046738 A1* | 2/2008 | Galloway | H04L 63/1416 713/176 |
| 2009/0183155 A1 | 7/2009 | Praitis et al. | |
| 2011/0061109 A1 | 3/2011 | Austin et al. | |
| 2012/0215853 A1 | 8/2012 | Sundaram et al. | |
| 2014/0074452 A1* | 3/2014 | Carmi | G06F 8/10 703/22 |
| 2016/0323307 A1* | 11/2016 | Savant | G06F 21/6218 |
| 2016/0337401 A1 | 11/2016 | Bendersky et al. | |
| 2017/0032138 A1* | 2/2017 | Navda | G06F 3/0481 |

* cited by examiner

*Primary Examiner* — Vance M Little
(74) *Attorney, Agent, or Firm* — Arent Fox LLP; Michael Fainberg

(57) ABSTRACT

Disclosed are system and methods for controlling access to content from a user application executing in an isolated environment on a user device. An exemplary method includes intercepting, by a security application, data relating to content in a graphical user interface of the user application using an accessibility application programming interface (API) exposed by an operating system of the user device, and generating a first template associated with the content based on the intercepted data. The template specifies a pattern of elements of the graphical user interface. The method further includes determining a category of the content based on a comparison of the first template with a plurality of previously generated templates; and controlling access to the content of the graphical user interface based on the determined category.

20 Claims, 4 Drawing Sheets

SYSTEM AND METHOD OF CONTROLLING ACCESS TO CONTENT USING AN ACCESSIBILITY API

CROSS-REFERENCE TO RELATED APPLICATIONS

The present disclosure claims benefit of priority under 35 U.S.C. 119(a)-(d) to a Russian Application No. 2017109812 filed on Mar. 24, 2017, which is incorporated by reference herein.

FIELD OF TECHNOLOGY

The present disclosure relates generally to the field of computer security, more specifically, to systems and methods of controlling access to content based on templates generated using an accessibility application programming interface (API).

BACKGROUND

In some operating systems (OS), notably in mobile OSs such as Android, in order to ensure security when executing user applications, the operating system organizes an isolated execution environment code (hereinafter, isolated environment) known as a "sandbox". The isolated environment usually constitutes a controllable set of software and hardware resources accessible to the application for its execution, such as space on the disk or in the memory, the number of processor cores which can be used, and so forth. Moreover, the isolated environment usually either partly emulates the execution of system functions—for example, access to a network (local area or Internet), OS functions, or reading information from data entry devices—or greatly restricts the possibility of their execution—. Applications running in such an isolated environment are not able to read much less write into regions of the RAM of the computing device (e.g., mobile device) which are accessible to or allocated to other applications.

In order to call system functions, a third-party user application needs to request and receive additional authorization. Usually, such authorizations are granted by the user either when installing an application (e.g., in earlier versions of the Android OS) or during the launching or execution of the application (e.g., in later versions of the Android OS and in other OS). Example of such authorizations include: permission to work with text messages (e.g., SMS/MMS messages), permission to access a user's contacts, and permissions to access network services. The volume of actions which an application can perform outside the isolated environment with the help of authorizations is likewise limited. The authorizations themselves are usually of various kinds: those which can be granted to all applications and those which are granted only to a limited group of applications, for example, only the applications constituting the firmware of the computing device or only the applications considered first-party by the OS.

A security application can also be considered a third-party application in this sense and thus limited in its rights within the isolated environment and those additional authorizations granted to it by the user. Therefore, difficulties arise when the security application attempts to analyze data obtained by other foreign applications (for example, from the Internet), since this data cannot be obtained and analyzed by the security application. There are no authorizations for reading the data of other applications in the list of authorizations provided to third-party applications by the operating system, since such authorizations are contrary to the approach of using an isolated environment.

Despite the relative protection of mobile devices against malicious applications (due to the above-described closed nature achieved with the aid of the isolated environment), problems of filtering out unwanted data content obtained by applications on mobile devices are rather serious. For example, parents may want to guard their children against undesirable links, obscene language, and other undesirable information; users may want to guard themselves against phishing, intrusive advertising, and so on; and companies may want their workers to use mobile devices only for business purposes.

Known security system are ineffective because they do not have the ability to receive and process data and content obtained by applications working in isolated environments. Therefore, there is a need to improve a mechanism for a security application to control access to content by user applications executing in an isolated environment on a mobile device.

SUMMARY

The operating systems of modern mobile devices often have subsystems which facilitate the ability for people with disabilities to work with the device. In a number of cases, such subsystems have application programming interfaces (API) which allow outside developers to create applications providing such people with alternative methods of perceiving information (voice reading of screen text, data output to an external device supporting the Braille alphabet, and so forth).

The described system and methods provide a security application that uses this accessibility API to intercept data about content being displayed by another user application, which would be otherwise difficult or impossible to obtain due to the use of isolated environments. The security application generates templates based on the intercepted data, and uses the template to classify the content on the user application as one or more categories of content. The security application may then control access based on the categories of content, for example, by restricting access or blocking display of the content by the user application.

As such, the proposed method makes it possible to identify the category of data received by applications on mobile devices with the use of the application programming interface for users with disabilities. The described technique may advantageously success in scenarios in which the conventional techniques cannot produce information which clearly identifies the content. For example, if a user has received a message in a messenger application (such as WhatsApp®) that contains a direct link to an image in a social network (such as Instagram®) and has opened the link, the content visible to the user and accessible to the functions of that interface might not contain the name of the application, the name of the user profile, or the name of the material.

In one exemplary aspect, a method is provided for controlling access to content from a user application executing in an isolated environment on a user device. The method includes intercepting, by a security application, data relating to content in a graphical user interface of the user application using an accessibility application programming interface (API) exposed by an operating system of the user device, and generating a first template associated with the content based on the intercepted data. The template specifies a pattern of elements of the graphical user interface. The method further includes determining a category of the content based on a comparison of the first template with a plurality of previously generated templates; and controlling access to the content of the graphical user interface based on the determined category.

According to another exemplary aspect, the first template specifies at least one of a relationship, a type, and one or more properties of one or more elements of the graphical user interface of the user application.

According to another exemplary aspect, the step of determining the category of the content based on the comparison of the first template with a plurality of previously generated templates further includes: determining the category of the content as undesirable based on comparison results that indicated the first template is similar to at least one of the previously generated templates whose category has been previously identified as undesirable.

According to another exemplary aspect, at least one of the previously generated templates is associated with a weighting factor.

According to another exemplary aspect, the plurality of previously generated templates are associated with specific versions of the user application, and wherein comparison of the first template with the previously generated templates is performed based on a version of the user application.

According to another exemplary aspect, the determined category of the content specifies a type of the user application in which the content is being displayed, and a type of the content.

According to another exemplary aspect, the method further includes registering, with the operating system, the security application as an accessibility service, wherein the security application is configured to support the accessibility API.

In one further exemplary aspect, a system is provided for controlling access to content from a user application executing in an isolated environment. In this aspect, the system includes a display device configured to render a graphical user interface of the user application, and a processor. The processor is configured to intercept, by a security application, data relating to content in the graphical user interface using an accessibility application programming interface (API) exposed by an operating system of the user device, and generate a first template associated with the content based on the intercepted data. The template specifies a pattern of elements of the graphical user interface. The processor is further configured to determine a category of the content based on a comparison of the first template with a plurality of previously generated templates, and control access to the content of the graphical user interface based on the determined category.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling access to content on mobile devices using an accessibility API. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
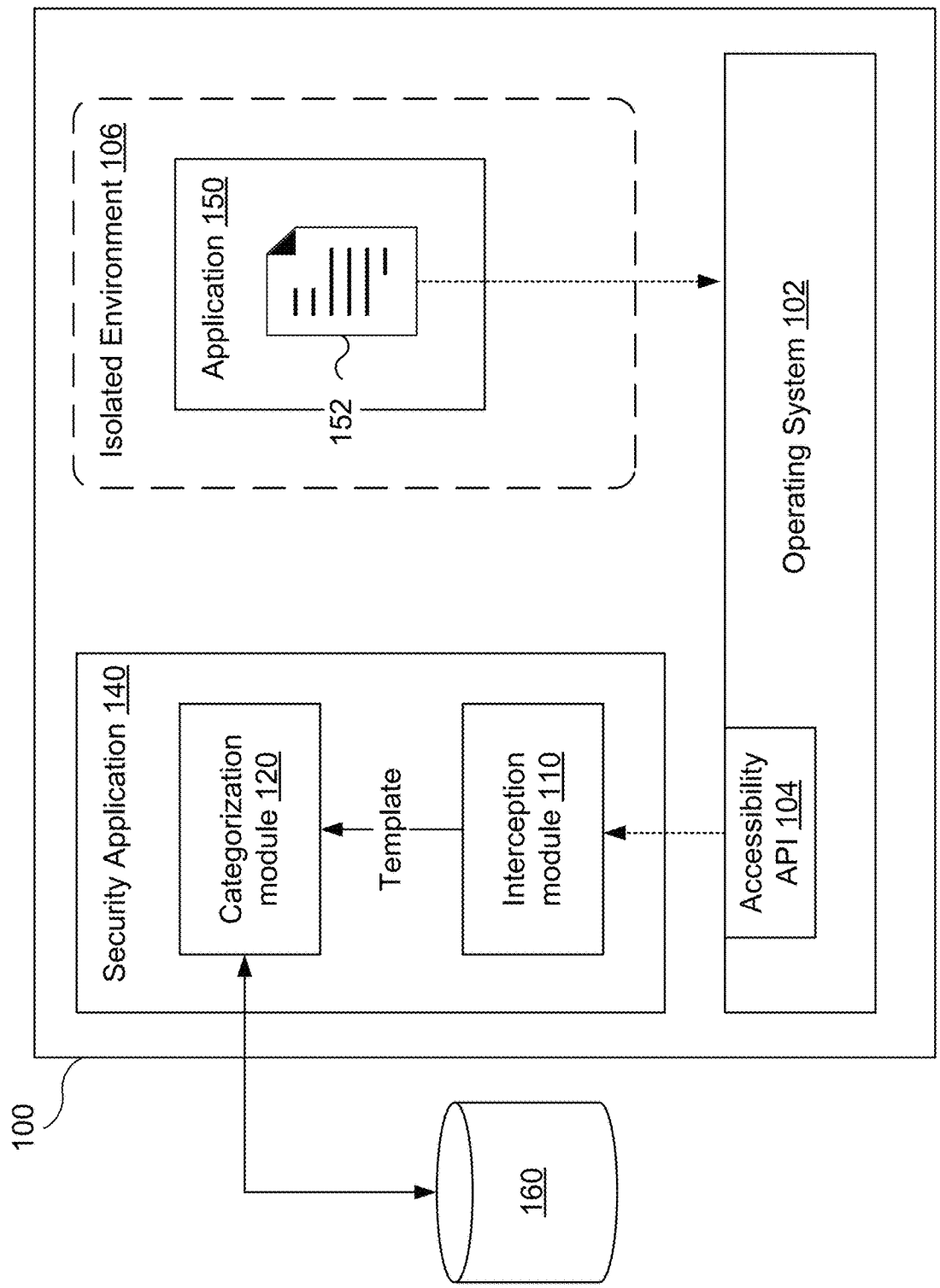
FIG. 1 illustrates a block diagram of a system for controlling access to content by a user application running in an isolated environment using an accessibility API, according to an exemplary aspect.

FIG. 1 illustrates a block diagram a system for controlling access to content by a user application running in an isolated environment using an accessibility application programming interface (API), according to an exemplary aspect. The system may be deployed on a user device 100, such as a desktop computer or a mobile device (e.g., a laptop computer, tablet, smart phone or other portable computing device). The terms "user device" and "mobile device" will be used interchangeably herein. A schematic diagram of an exemplary aspect of a user device 100 will be described later with reference to FIG. 4.

The user device 100 may execute one or more user applications 150 (e.g., Internet browser, text processing application, etc.). Each user application 150 may be configured to generate, load, and display a graphical user interface on the user device 100 for interfacing with the user application 150. The graphical user interface may contain content 152 for consumption and/or interaction with the user. Content 152 of a user application may include any combination of text data, audio data, video data, and any other types of multimedia, and may be provided in a variety of formats, including web pages, web applications, mobile applications, image files (e.g., static and animated GIFs), video files, sound files, streaming video and sound files, and so forth.

In order to protect the user from possible malicious applications, an operating system 102 of the user device 100 may be configured to create an isolated environment 106, such as a sandbox, for executing each user application 150, for example, at the time of launching of the user application

150. During their execution in the isolated environment 106, the user applications 150 may try to access various data from files, user input or the Internet, and access various OS services and system resources, or even to other user applications 150. The isolated environment 106 may be configured to restrict data access rights of the user applications 150 as well as to place limitations on the access to various OS services and system resources.

The system for identifying categories of data on mobile devices with use of an accessibility API designed for developing applications for users with disabilities is part of a security application 140 (such as an antivirus application) and includes an interception module 110 and a categorization module 120. As used herein, an accessibility API is a set of functions exposed by an operating system and designed for the creation of applications suitable for users with limited abilities. Applications that support an accessibility API are configured to expose information relating to the user interface of the application including both control elements and data contained in the application so as to allow programmatic access (via the accessibility API) by an accessibility application. An accessibility application is an application that provides user interface enhancements to assist users with limited abilities, for example, a screen reader application.

The security application 140 is configured as an accessibility service supporting the accessibility API 104 exposed by an operating system 102. For example, the security application 140 contains a configuration that declares itself to the operating system 102 as an accessibility service. The security application 140 is configured to handle one or more types of accessibility events generated by the operating system 102, as described in greater detail below. In one exemplary aspect, the user is asked to install the security application 140 as a system service of the operating system 102 on the mobile device for users with limited abilities (i.e., accessibility service). For this, for example in the Android OS versions 7.x and earlier, a user might open the Accessibility system settings tab and select the security application 140 as one of the providers of this service.

The interception module 110 is configured to intercept content 152 pertaining to an application 150 with which the user is interacting that is being loaded and presented on the display of the mobile device. In the general case, the content represents data which contains elements of the graphic user interface (GUI). The content data represents a file of given format, such as a web page. In one exemplary aspect, the content is loaded by the application from the internal memory of the mobile device. In another exemplary aspect, the content is loaded by the application from the Internet. It should be noted that the user interacts with the application 150 to view the content 152 and enter data by means of navigation buttons and/or the touch screen of the mobile device, for example. The application 150 makes use of graphic interface elements which determine the external appearance of the interface of the application 150. Often applications 150 make use of so-called "themes" containing styles and formatting of the graphic application elements. Moreover, applications 150 often contain mechanisms for adapting the output of content onto the display of the mobile device, for example depending on the resolution of the display of the mobile device, the orientation of the display of the mobile device (portrait or landscape), and the version of the operating system 102 under whose control the mobile device is working.

After intercepting the content 152 pertaining to the application 150 with which the user is interacting that is being loaded and presented on the display of the mobile device, the interception module 110 is configured to generate a template of this content. In one exemplary aspect, the template contains a relationship 180, a type 185, and one or more properties 190 of the elements of the graphical user interface. In some exemplary aspects, a relationship 180 associated with an element in the GUI may specify a positional relationship to another element in the GUI based on a graphical distance to the other element. For example, the relationship 180 may specify one or more graphical coordinates providing an absolute position of the element within the GUI, or graphical coordinates providing a relative position of the element relative to the other element. In some exemplary aspects, the relationship 180 associated with the element in the GUI may specify a hierarchical relationship to another element in the GUI based on a node hierarchy between elements in the GUI, for example, a child-parent relationship derived from the document object model of HTML elements in a web page. In one exemplary aspect, the type 185 of an element of the GUI may specify one particular type of content displayed by that element, such as text, images, video. An exemplary template is described in greater detail in FIG. 2.

Figure 2:
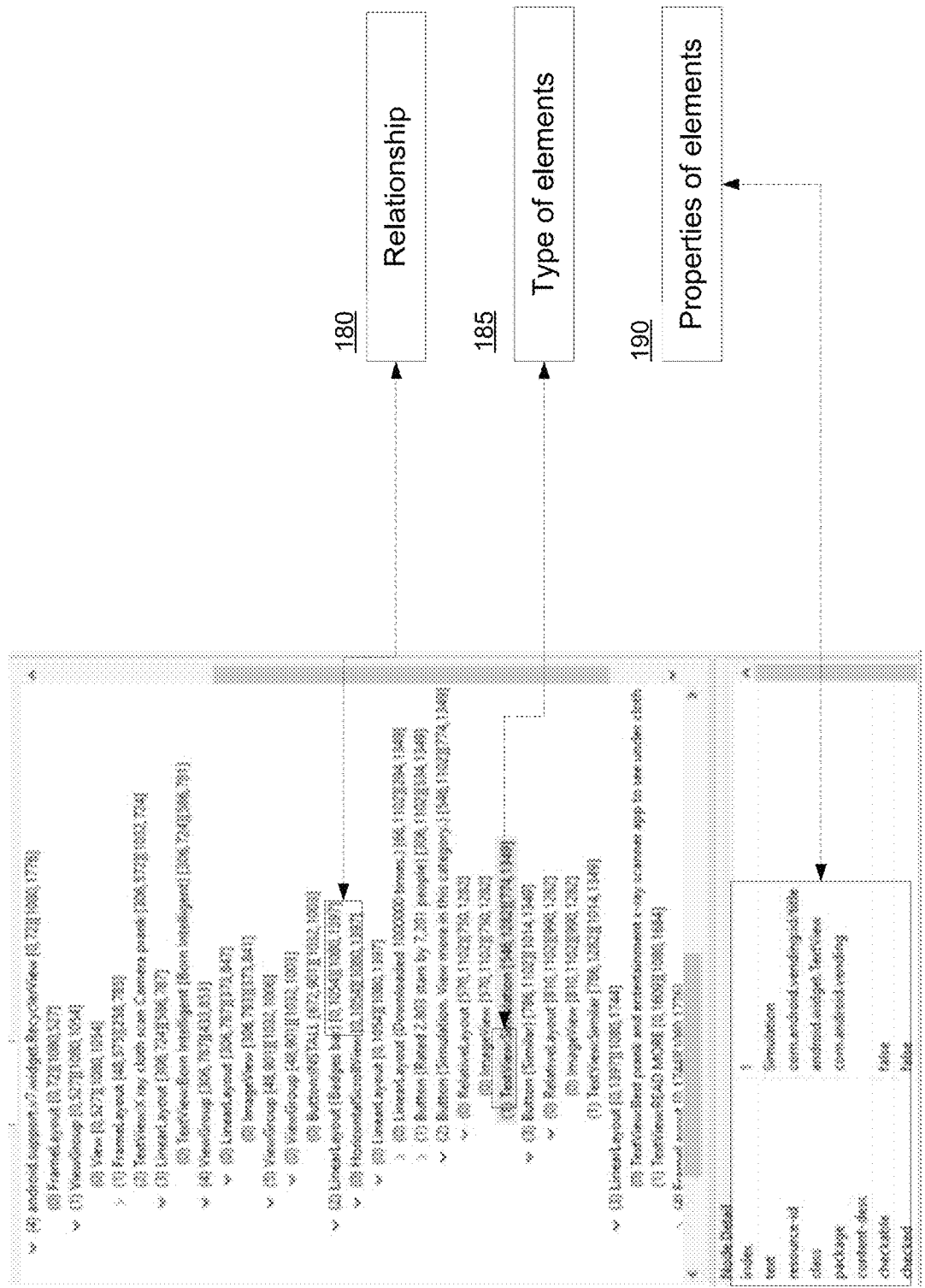
FIG. 2 illustrates a block diagram depicting data related to elements of a graphic user interface intercepted by a security application, according to an exemplary aspect.

FIG. 2 illustrates a block diagram depicting data related to elements of a graphic user interface intercepted by a security application, according to an exemplary aspect. In one exemplary aspect, the interception module 110 generates a template specifying a pattern of elements in a graphical user interface based on data intercepted using the accessibility API 104. In one exemplary aspect, the intercepted data may be contained in a tree data structure containing node and window information related to the elements in a graphical user interface, although it is understood that other formats and implementations may be used. For sake of illustration, FIG. 2 depicts an example tree data structure for a GUI as rendered by a software development inspector application, and annotated with parts of the template.

Using the example of a digital media store application (e.g., Google Play™) application, each content being loaded and presented on the display of the mobile device (hereinafter, a page) has its own structure of elements. There is a page containing a menu and there are pages with elements (books, applications, films). In subsequent navigation, the user can switch to the description of an individual element being presented in digital media store application, and then go to the section of user comments showing their evaluations. In this example, the interception module 110 identifies the structure of the elements of each page (the content being loaded and shown on the display of the mobile device) where the user ends up in the course of the navigation through the application 150. The structure represents a sequence of elements—buttons, text fields, scrollbars, view areas, frames. In one exemplary aspect, the structure contains the presence of sequences of elements or groups of elements (tables, lists). Next, the interception module 110 identifies (i.e., read) the values and properties of the elements, such as text strings from text fields, colors, font sizes, frames, buttons, checkboxes.

Taking the above into account, the interception module 110 generates a template based on the content 152, the template containing the relationship 180, the type 185, and the properties 190 of the elements of the graphic user interface. For example, the template may specify that one particular element has a type 185 for displaying text (e.g., TextView). The template may further specify the text element has parent-child relationship 185 with one or more elements, for example, a layout container element identified as a "Badges bar." The template may specify one or more additional node properties 190 associated with the text element, for example, the text it contains (e.g., "Simulation"), a resource identifier, class and package information, and control element state information (e.g., not checked, not checkable). In another example, an element of type 185 "com.android.checkbox" has the property 190 "checked" with the value "false" and a relationship 185 relative to the element of type "com.android.button" which is arranged 50 pixels above and 30 pixels to the right.

Referring back to FIG. 1, the interception module 110 is configured to provide the generated template to the categorization module 120. It should be noted that in one exemplary aspect the categorization module 120 is a module (part) of the security application 140. In another exemplary aspect, the categorization module 120 is implemented on a remote server or as a cloud service.

In one exemplary aspect, the categorization module 120 is configured to maintain a set of templates previously created on the basis of the content whose categories have been identified.

In the context of the present disclosure, the category of a content is a set of properties containing at least the type of application 150 during the navigation of which the content has been loaded and displayed, and the type of the content itself. As described earlier, the type of the application 150 can be a web browser, a messenger, a social network application, applications for distribution of media content (Google Play, Samsung Apps™), applications for viewing video streams from the Internet, applications for viewing video broadcasts from the Internet, multimedia players, and so forth. In some exemplary aspects, the type of the content can include the entire screen of an application, the comment section, the message exchange section, a content section typical of the particular application (description of video material on YouTube®, description of an application in Google Play, description of a film in an online movie theater), and so forth.

In one exemplary aspect, the set of templates of content whose category has been previously identified is stored in a database 160 or other storage module or device. In one exemplary aspect, the set of templates is generated with the use of the accessibility API for known applications, known types of applications and known types of content.

It should be noted that the template may (or may not) depend on the version of the application in which the content was downloaded and displayed (with the release of a new application version, the structure of the elements of the graphic interface and the template as a whole may change), and therefore in one exemplary aspect, the database 160 stores records about versions of applications and their corresponding templates. Thus, for example, if the database 160 contains a template of a particular web browser application (e.g., Google Chrome™) version 9.12, the categorization module 120 can clearly determine from this template the web browser application of the corresponding version. However, with the release of version 9.13, the web browser application in some cases (for example, if a control element has been added, if the external appearance of a window or font style has been changed) will no longer be clearly determined from the template by the categorization module 120. Nevertheless, the categorization module 120 will assign the web browser application version 9.13 to the browser type.

In one exemplary aspect, the templates can have at least one weighting factor (for example, the popularity of known applications or the popularity of content within an application, such as the popularity of a video on YouTube) in order to speed up the determination of categories by the categorization module 120. In this case, the categorization module 120 selects templates from the database 160 in accordance with the weighting factors. Thus, for example, user applications 150 from a digital media store or platform marketplace may have popularity ratings, such as most downloaded, most highly-rated, etc. In accordance with the mentioned ratings, the database 160 for templates may store weighting factors of popularity. The categorization module 120 selects N (e.g., 1000) templates of the most popular applications and compares them to the generated template obtained from the interception module 110. In another example, it is possible to select M each (such as 10) of the most popular templates of the most popular types of applications. For example, the categorization module 120 may compare 10 of the most popular templates of message exchange programs (e.g., or top 10 templates of browsers, or top 100 templates of games) to the generated template obtained from the interception module 110.

Furthermore, the categorization module 120 uses a set of comparison rules against which the template received from the interception module 110 is compared to templates whose categories have been identified. In some exemplary aspects, the rules can be trusted or deterministic, i.e., clearly identifying the content. In another exemplary aspect, the rules can be probabilistic, i.e., identifying the content with a probability, making use of methods for identifying the degree of similarity of templates known in the prior art. The rules in turn may be determined for individual templates or for groups of templates.

In one exemplary aspect, with the use of the rules the categorization module 120 identifies not only the type of application, but also the application itself (such as its name and version). In the general case, the comparison rules are kept in the database 160.

Furthermore, in one exemplary aspect, the categorization module 120 selects a set of unsafe or undesirable categories reflecting the presence of information in the content which may be undesirable for various groups of users. Such information may include sexual content with age restrictions, alcohol, tobacco, narcotics, violence, profanity, weapons, and other objectionable content.

As an example, let us consider the above-described digital media store application (e.g., Google Play). The content of this application might have been analyzed previously by methods known in the prior art. For example, the pages of applications (or books) presented for installation have been analyzed. For the pages of popular applications of each type in the digital media store application, templates have been created, and categories, determined. The categorization module 120 compares the template obtained from the interception module 110 with the mentioned most popular templates. As a result of the comparison, it is found that the user wants to download, from the digital media store application, an application which is distributing or advertising sexual content. As a result, steps may be taken preventing the application from getting onto the mobile device of the user. For example, the security application 140 may block the downloading and installing of an application.

Another example of the determining of a category is the situation which occurs when communicating with an unknown contact through a messenger application (e.g., "WhatsApp®"). The categorization module 120 can determine from the template received from the interception module 110 that the user is communicating through the messenger application with an unknown number. The messenger application itself can be identified with a high degree of probability from the style (format) of the chat window. However, the telephone number (displayed at the top in place of the contact name) will be present in the template. This element clearly indicates that the number is not among the user's contacts, and so the communication is occurring with an unknown party. Such a communication may be blocked afterwards, since such contacts are categorized as unsafe or undesirable, for example in the context of parental control for children using a mobile device.

Figure 3:
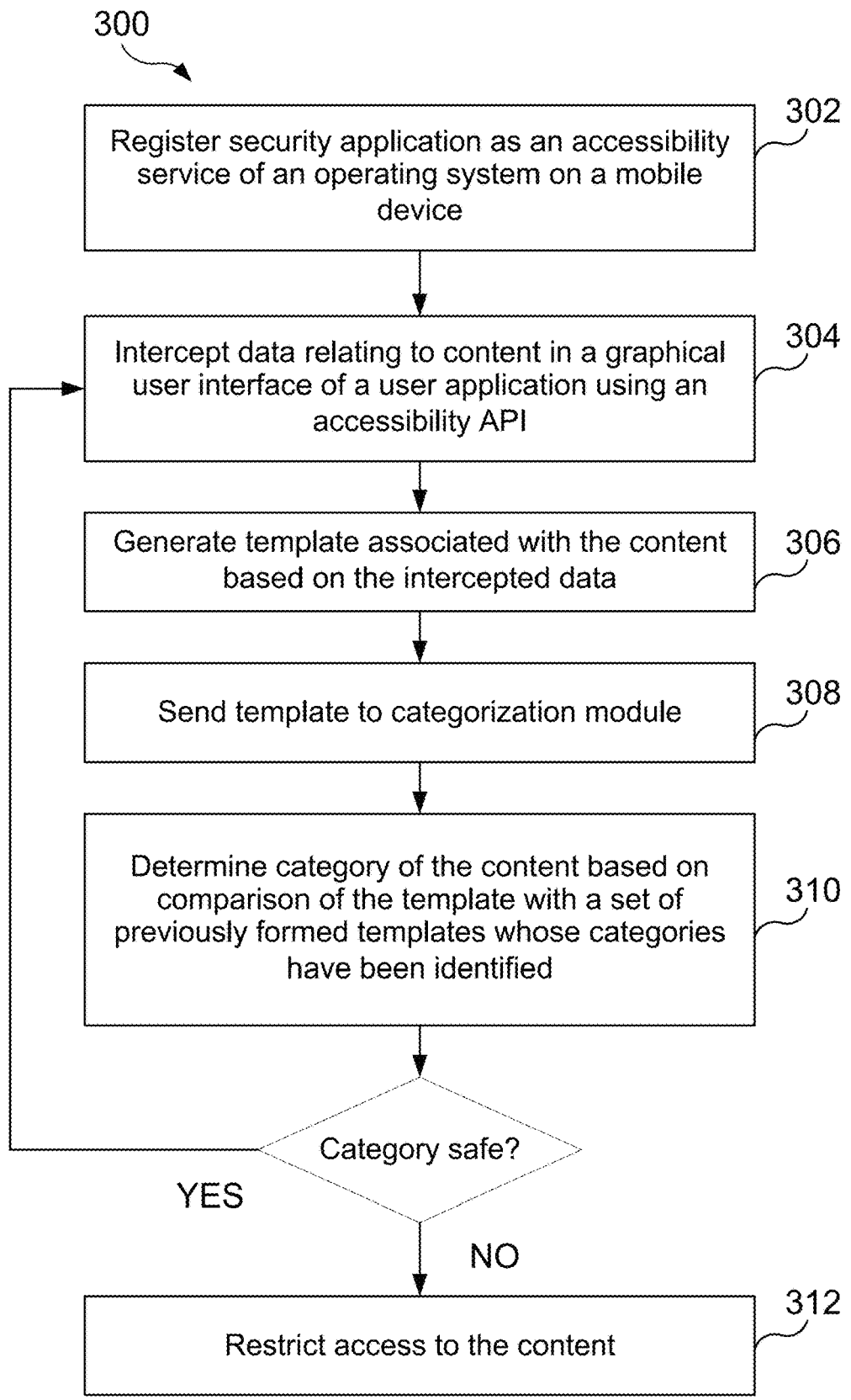
FIG. 3 illustrates a flowchart for a method for controlling access to content by a user application running in an isolated environment using an accessibility API, according to an exemplary aspect.

FIG. 3 illustrates a flowchart for a method 300 for identifying categories of data using an accessibility API, according to an exemplary aspect.

The method 300 begins at step 302, in which the security application 140, which includes at least the interception module 110, registers as a system service for users with limited abilities of the operating system on the mobile device. In one exemplary aspect, the security application 140 also includes the categorization module 120. In another exemplary aspect, the categorization module 120 is implemented on a remote server or as a cloud service.

In step 304, the interception module 110 intercepts data relating to content in a graphical user interface of an user application using an accessibility API exposed by the operating system of the user device. For example, the interception module 110 using the application programming interface designed for creating of applications for users with disabilities is used to intercept content being downloaded and presented on the display of the mobile device relating to an application with which the user is interacting. The content may represent data which contains elements of a graphic user interface. In one exemplary aspect, the content is downloaded by the application from the internal memory of the mobile device. In another variant embodiment, the content is downloaded by the application from the Internet.

In one exemplary aspect, the interception module 110 may use one or more event handlers of the security application 140 registered with the accessibility API 104 to intercept various types of events generated during execution of the user applications 150, such as: pressing/holding down of an element of the graphic user interface (GUI) of the user application 150; shifting of focus to another element of the GUI of the user application 150; selecting of an object in an element of the GUI containing a list of objects (such as changing a selected element in ListBox or RadioButton-Group); changing of text in an element of the GUI of the user application 150; displaying a window (main or dialog window) of the user application 150 on the screen of the user device 100.

In step 306 the interception module 110 generates a template of the mentioned content based on the intercepted data. The template specifies a pattern of elements of the graphical user interface. The template contains the relationship 180, the type 185 and the properties 190 of the elements of the graphic user interface. For example, in cases where the intercepted data is formatted as a tree data structure, the interception module 110 may iteratively walk through the nodes in the tree data structure, read each node, and create the template based on the properties observed in the nodes.

For example, the interception module 110 may generate one or more templates of content from a photo-sharing application (e.g., Instagram®) executing on the user device. The interception module 110 may generate a first template corresponding to content from a "newsfeed" view of the photo-sharing application, which includes a continuous listing of other users' recent photos and videos. If the user clicks or taps on a picture from the newsfeed view, the photo-sharing application renders and displays a detailed view of that picture. In response to this change in the GUI, which the accessibility API detects and triggers events for, the interception module 110 may generate a second template for content in the second, detailed view of the photo-sharing application. Say the user scrolls down the detailed view of the picture and moves to a comments section of the view. The interception module 110 may generate a third template for this section of the GUI. It is noted that if any or all of these templates for the photo-sharing application were previously generated, when the user then subsequently opens any page or view in the photo-sharing application, the interception module 110 can determine which previous template can be applied.

In step 308 the interception module 110 provides the generated template to the categorization module 120. In cases where the categorization module 120 is implemented on a remote server or as a cloud service, the security application 140 transmits the generated template to the categorization module 120 over a network.

In step 310 the categorization module 120 determines a category of the content based on a comparison of the generated template with a plurality of previously generated templates. In one exemplary aspect, the categorization module 120 is used to compare the generated template with a set of templates previously formed with the use of the mentioned application programming interface of templates whose categories have been identified (e.g., as unsafe), and on the basis of the results of the comparison at least one category of the mentioned content is identified (e.g., as unsafe). In the context of the present disclosure, the category of the content is a set of properties containing at least the type of the application 150 during whose navigation the content was downloaded and displayed, and the type of the content itself.

In the general case, the set of templates of content whose categories have been previously identified is kept in the database 160. In the context of the present disclosure, the set of templates is formed with the use of the application programming interface designed for creating of applications for users with limited abilities for known applications, known types of applications, and known types of content.

In one exemplary aspect, the templates can have a weighting factor to speed up the determination of the categories by the categorization module 120. In this case, the categorization module 120 selects templates from the database in accordance with the weighting factors. Furthermore, the categorization module 120 uses a set of comparison rules by which the template received from the interception module 110 is compared to templates whose categories have been identified. In one aspect, the rules can be trusted (clearly identifying the content). In another aspect, the rules can be probable (identifying the content with a probability, making use of methods for identifying the degree of similarity of templates known in the prior art). The rules in turn may be determined for individual templates or for groups of templates. In the general case, the comparison rules are stored in the database 160.

At step 312, the security application 140 controls access to the content of the graphical user interface based on the determined category. For example, responsive to determining that content in the graphical user interface is classified as unsuitable for children, the security application 140 may block the user application from visiting undesirable links or displaying obscene language. In another example, responsive to determining that the content in the GUI is classified as unsafe, the security application 140 may flag the user application 150 for phishing or for intrusive advertising. In another example, responsive to determining that the content in the GUI is classified as non-business-related, the security application 140 may block a mobile device from installing a non-business related user application, or accessing non-business related websites. Other techniques for blocking access to content in a user application executing in an isolated environment are described in greater detail in a commonly owned U.S. Pat. No. 9,536,101, which is incorporated by reference herein.

Figure 4:
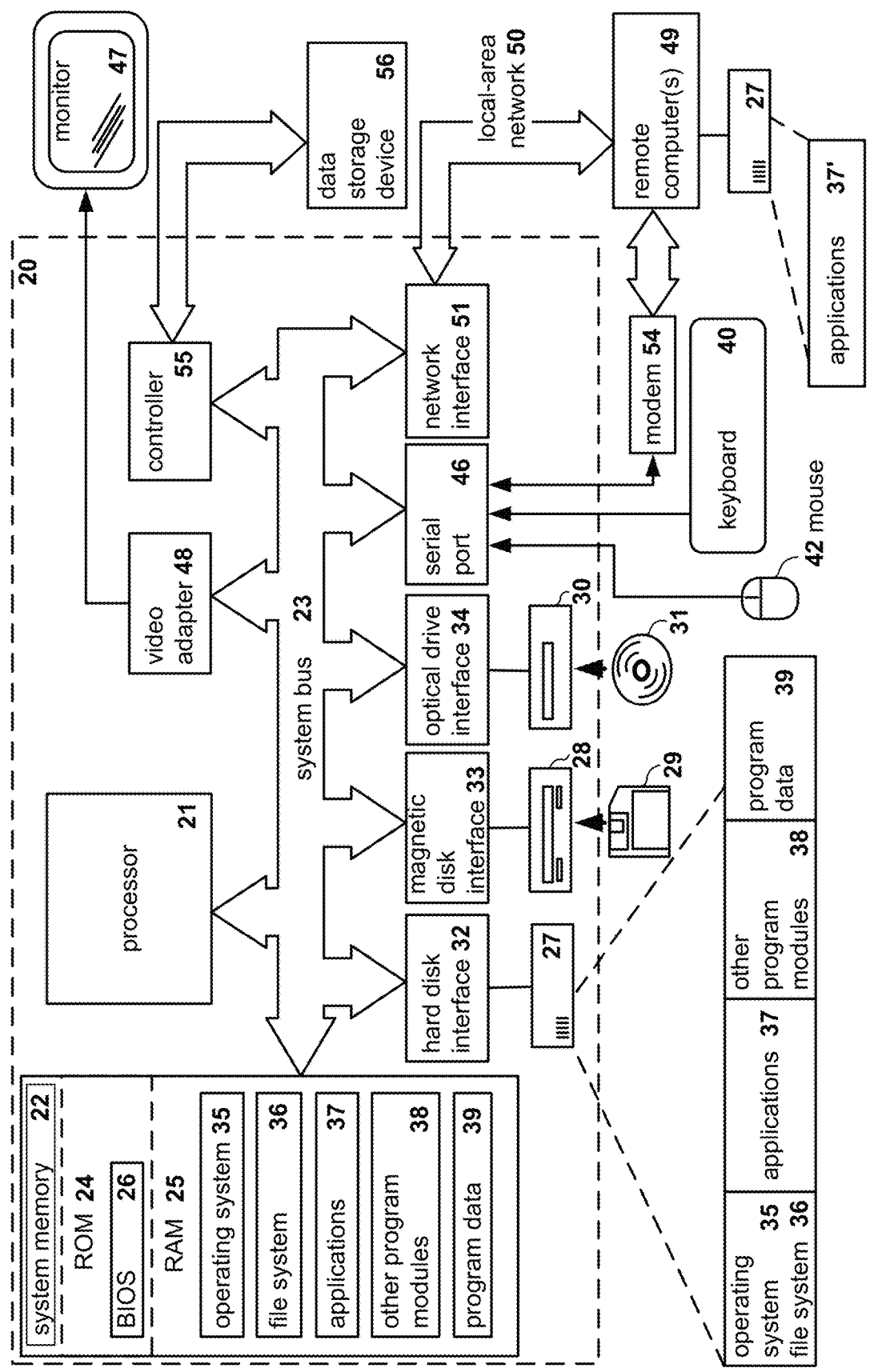
FIG. 4 illustrates a block diagram of an example of a general-purpose computer system on which the disclosed system and method can be implemented according to an exemplary aspect.

FIG. 4 is a diagram illustrating an example computer system on which aspects of systems and methods for controlling access to content in a user application using an accessibility API may be implemented in accordance with an exemplary aspect. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, as well as those based on neuromorphic chips (neurosynaptic chips), which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to content from a user application executing in an isolated environment on a user device, the method comprising;
   intercepting, by a security application, data relating to content in a graphical user interface of the user application using an accessibility application programming interface (API) exposed by an operating system of the user device;
   generating a first template associated with the content based on the intercepted data, wherein the template is fillable and specifies a pattern of elements of the graphical user interface, the pattern of elements including, for each element, at least a positional relationship to at least one other element of the graphical user interface that is based on a graphical distance between the element and the other element;
   determining a category of the content based on a comparison of the first template with a plurality of previously generated templates, wherein the category of the content is determined as being undesirable when results of the comparison indicate that the first template is similar to at least one of the previously generated templates whose category has been previously identified as being undesirable; and
   controlling access to the content of the graphical user interface based on the determined category.

2. The method of claim 1, wherein the first template specifies at least one of a relationship, a type, and one or more properties of one or more elements of the graphical user interface of the user application.

3. The method of claim 1, wherein the plurality of previously generated templates are selected in accordance with respective weight factors associated with the previously generated templates.

4. The method of claim 1, wherein at least one of the previously generated templates is associated with a weighting factor.

5. The method of claim 1, wherein the plurality of previously generated templates are associated with specific versions of the user application, and wherein comparison of the first template with the previously generated templates is performed based on a version of the user application.

6. The method of claim 1, wherein the determined category of the content specifies a type of the user application in which the content is being displayed, and a type of the content.

7. The method of claim 1, further comprising:
   registering, with the operating system, the security application as an accessibility service, wherein the security application is configured to support the accessibility API.

8. A system for controlling access to content from a user application executing in an isolated environment, the system comprising:
   a display device configured to render a graphical user interface of the user application; and
   a processor configured to:
   intercept, by a security application, data relating to content in the graphical user interface using an accessibility application programming interface (API) exposed by an operating system of the user device;
   generate a first template associated with the content based on the intercepted data, wherein the template specifies a pattern of elements of the graphical user interface, the pattern of elements including, for each element, at least a positional relationship to at least one other element of the graphical user interface that is based on a graphical distance between the element and the other element;
   determine a category of the content based on a comparison of the first template with a plurality of previously generated templates, wherein the category of the content is determined as being undesirable when results of the comparison indicate that the first template is similar to at least one of the previously generated templates whose category has been previously identified as being undesirable; and
   control access to the content of the graphical user interface based on the determined category.

9. The system of claim 8, wherein the first template specifies at least one of a relationship, a type, and one or more properties of one or more elements of the graphical user interface of the user application.

10. The system of claim 8, wherein the plurality of previously generated templates are selected in accordance with respective weight factors associated with the previously generated templates.

11. The system of claim 8, wherein at least one of the previously generated templates is associated with a weighting factor.

12. The system of claim 8, wherein the plurality of previously generated templates are associated with specific versions of the user application, and wherein comparison of the first template with the previously generated templates is performed based on a version of the user application.

13. The system of claim 8, wherein the determined category of the content specifies a type of the user application in which the content is being displayed, and a type of the content.

14. The system of claim 8, wherein the processor is further configured to:
   register, with the operating system, the security application as an accessibility service, wherein the security application is configured to support the accessibility API.

15. A non-transitory computer readable medium storing computer executable instructions for controlling access to content from a user application executing in an isolated environment, including instructions for:

intercepting, by a security application, data relating to content in a graphical user interface of the user application using an accessibility application programming interface (API) exposed by an operating system of the user device;

generating a first template associated with the content based on the intercepted data, wherein the template specifies a pattern of elements of the graphical user interface, the pattern of elements including, for each element, at least a positional relationship to at least one other element of the graphical user interface that is based on a graphical distance between the element and the other element;

determining a category of the content based on a comparison of the first template with a plurality of previously generated templates, wherein the category of the content is determined as being undesirable when results of the comparison indicate that the first template is similar to at least one of the previously generated templates whose category has been previously identified as being undesirable; and controlling access to the content of the graphical user interface based on the determined category.

16. The non-transitory computer readable medium of claim 15, wherein the first template specifies at least one of a relationship, a type, and one or more properties of one or more elements of the graphical user interface of the user application.

17. The non-transitory computer readable medium of claim 15, wherein the plurality of previously generated templates are selected in accordance with respective weight factors associated with the previously generated templates.

18. The non-transitory computer readable medium of claim 15, wherein at least one of the previously generated templates is associated with a weighting factor.

19. The non-transitory computer readable medium of claim 15, wherein the plurality of previously generated templates are associated with specific versions of the user application, and wherein comparison of the first template with the previously generated templates is performed based on a version of the user application.

20. The non-transitory computer readable medium of claim 15, further comprising instructions for:

registering, with the operating system, the security application as an accessibility service, wherein the security application is configured to support the accessibility API.

\* \* \* \* \*

UNITED STATES PATENT AND TRADEMARK OFFICE
CERTIFICATE OF CORRECTION

PATENT NO. : 10,747,890 B2
APPLICATION NO. : 15/581056
DATED : August 18, 2020
INVENTOR(S) : Victor V. Yablokov et al.

It is certified that error appears in the above-identified patent and that said Letters Patent is hereby corrected as shown below:

On the Title Page

Item (73) Assignee Reads:
AO Kapersky Lab

Should Read:
AO Kaspersky Lab

Signed and Sealed this
Third Day of November, 2020

Andrei Iancu
*Director of the United States Patent and Trademark Office*